US011922781B2

(12) United States Patent
DeLucia

(10) Patent No.: US 11,922,781 B2
(45) Date of Patent: *Mar. 5, 2024

(54) BLACKJACK-BASED WAGERING GAME SYSTEMS AND METHODS

(71) Applicant: David D. DeLucia, Las Vegas, NV (US)

(72) Inventor: David D. DeLucia, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,166

(22) Filed: Aug. 22, 2022

(65) Prior Publication Data

US 2022/0406149 A1 Dec. 22, 2022

Related U.S. Application Data

(63) Continuation of application No. 17/088,573, filed on Nov. 3, 2020, now Pat. No. 11,423,746, which is a continuation of application No. 14/712,560, filed on May 14, 2015, now Pat. No. 10,825,304.

(60) Provisional application No. 62/004,821, filed on May 29, 2014.

(51) Int. Cl.
*G07F 17/32* (2006.01)
*A63F 1/00* (2006.01)

(52) U.S. Cl.
CPC ............ *G07F 17/3293* (2013.01); *A63F 1/00* (2013.01); *G07F 17/3211* (2013.01); *G07F 17/3244* (2013.01); *G07F 17/3262* (2013.01); *A63F 2001/003* (2013.01)

(58) Field of Classification Search
CPC ........ A63F 1/00; A63F 9/24; A63F 2001/003; G07F 17/3293; G07F 17/3211; G07F 17/3244; G07F 17/3262
See application file for complete search history.

(56) References Cited

U.S. PATENT DOCUMENTS

| | | | | |
|---|---|---|---|---|
| 4,659,087 A * | 4/1987 | Shen | A63F 3/00157 | 273/274 |
| 5,322,295 A * | 6/1994 | Cabot | A63F 3/00157 | 273/274 |
| 5,411,268 A * | 5/1995 | Nelson | A63F 3/00157 | 273/292 |
| 5,678,821 A * | 10/1997 | Hedman | A63F 3/00157 | 273/274 |
| 5,732,949 A * | 3/1998 | Josephs | A63F 1/00 | 273/292 |
| 5,810,354 A * | 9/1998 | Banyai | A63F 3/00157 | 273/274 |
| 6,179,293 B1 * | 1/2001 | Hedman | A63F 3/00157 | 273/274 |
| 6,877,748 B1 * | 4/2005 | Patroni | A63F 3/00157 | 273/274 |
| 7,435,172 B2 * | 10/2008 | Hall | A63F 1/06 | 273/292 |
| 2003/0094761 A1 * | 5/2003 | Furuta | A63F 3/00157 | 273/303 |
| 2004/0217547 A1 * | 11/2004 | Lau | C02F 1/66 | 273/292 |

(Continued)

*Primary Examiner* — Malina D. Blaise
(74) *Attorney, Agent, or Firm* — Newman Law, LLC

(57) ABSTRACT

Systems and methods for providing, conducting and modifying Blackjack involving standard playing cards in which players form two player hands to compete against two dealer hands that are set according to a preset house way.

14 Claims, 3 Drawing Sheets

(56) References Cited

U.S. PATENT DOCUMENTS

| | | | | |
|---|---|---|---|---|
| 2006/0025191 | A1* | 2/2006 | Snow | G07F 17/32 463/13 |
| 2006/0055112 | A1* | 3/2006 | Lean | A63F 3/00157 273/292 |
| 2008/0191417 | A1* | 8/2008 | Pham | A63F 1/00 273/292 |
| 2009/0305761 | A1* | 12/2009 | Jackson | G07F 17/3293 463/12 |
| 2011/0198809 | A1* | 8/2011 | Sparago | A63F 3/00157 273/292 |
| 2013/0059636 | A1* | 3/2013 | Hedge, Jr. | A63F 1/00 463/42 |
| 2013/0059637 | A1* | 3/2013 | Lima | G07F 17/32 463/13 |
| 2013/0079084 | A1* | 3/2013 | Sparago | A63F 1/00 463/11 |

* cited by examiner

BLACKJACK-BASED WAGERING GAME SYSTEMS AND METHODS

CROSS-REFERENCE TO RELATED APPLICATIONS

This application claims the benefit of U.S. Provisional Patent Application No. 62/004,821 which was filed May 29, 2014, the disclosure of which is incorporated herein by reference.

BACKGROUND

Field of the Invention

The invention generally relates to systems and methods of providing, hosting, conducting and/or facilitating modified wagering games. In particular, the invention relates to systems and methods for providing, hosting, conducting and/or facilitating Blackjack-based wagering games, among other things.

Description of the Related Art

Many card games have been developed over the years and some are particularly adapted for gambling. Typically, such games include a dealer who deals cards and one or more players who place wagers on whether an outcome will be achieved based on the cards that the dealer deals. One example in this regard is Blackjack which is also known as Twenty-One.

The objective of Blackjack is for a wagering player to finish a round of play with a hand of playing cards with a sum of the total value of cards coming as close as possible to the value of twenty-one, without the player hand total exceeding twenty-one. The game is played by one or more players against a dealer with the player making an initial wager on a final outcome under the rules of blackjack, which remain fairly consistent throughout the world, and with only minor variations in different casinos or jurisdictions. Players' hands that are less than or equal to twenty-one, and exceed the value of the dealer's hand wins. All players' hands that have a lower sum than the dealer's hand and all hands that exceed the sum of twenty-one lose. Dealer and Player hands with the same total value (without the player first busting, result in ties (called a "push"). An initial two-card hand totaling twenty-one points is called blackjack, and in the absence of the dealer having a similar hand, automatically wins, without respect to the dealer's hand final; count and is often paid at odds greater than 1:1.

One conventional method of playing Blackjack uses one or more standard decks of playing cards (a fifty-two card deck without jokers). Each numbered card is counted according to its face value. The Jacks, Queens and Kings are worth ten (10), and Aces are worth either one (1) or eleven (11), depending on which is most beneficial to the count of the hand. A "ten" card therefore hereinafter includes any card which has a value of ten in the game of Blackjack, that is, a numbered 10 card, Jacks, Queens and Kings.

Once all the bets are made, the dealer will deal the cards to the players. The dealer will make two passes around the table starting with the player farthest to the left so that the players and the dealer have one card after the first pass and then receive a second card each after the second pass. The two cards dealt to the dealer or house includes one card face up or otherwise exposed to view, usually the second (and last) card dealt.

A player views an initial value of cards in the player's hand, views the dealer's up-card (the exposed card) and then makes decisions on drawing or not drawing further playing cards. This further drawing is done in an attempt to try and win the hand by having a higher count than the dealer's hand without busting, or allowing the dealer to bust the house hand. The player can "stand" on any count of twenty-one or less. Once the player exceeds a count of twenty-one or "busts," the player wager is lost, whatever the ultimate point count of the dealer's hand. Usually, the dealer must hit when with a point count of less than seventeen. Normally a dealer must stand on a soft count of at least seventeen, a soft count being a hand value where an Ace is counted as a value of eleven. House rules may vary, however.

While Blackjack is a very popular game, players tend to be drawn to games that provide numerous wagering opportunities that increase player participation and excitement. Thus, there is an interest in providing variations of existing wagering games which include new wagering opportunities and acceptable odds of winning.

SUMMARY OF THE INVENTION

The invention is generally directed to systems and methods for providing a modified wagering game involving standard playing cards in which a plurality of cards from a randomly ordered one or more decks of standard playing cards are distributed to each player position, from which player selections are received to form at least two initial Blackjack hands from the plurality of distributed cards which may be then played against two corresponding dealer hands.

Some embodiments of the invention are directed to a method of conducting a Blackjack-based wagering game, comprising the steps of: activating a shuffling device or hand shuffling to deliver one or more randomly ordered decks of physical playing cards; receiving at least one game wager; distributing the playing cards from the one or more randomly ordered decks of physical playing cards to form an initial player hand for each participating player and an initial dealer hand, wherein each of the initial hands include at least three playing cards and the identity of one or more of the playing cards of the initial dealer hand is revealed; receiving a player selection from each participating player to divide the playing cards in the respective initial player hand into a high Blackjack game hand and a low Blackjack game hand, wherein the high Blackjack game hand must be of a numerical value greater than or equal to the low Blackjack game hand according to the standard rules of Blackjack; continuing the Blackjack game according to the standard rules of Blackjack to form final high and low Blackjack game hands; forming a final high and a final low dealer Blackjack hands from the initial dealer hand according to preset house rules; and settling the game wager based on the outcome of the comparison of the hand values of the final player Blackjack hands and the final dealer Blackjack hands, wherein half of the at least one game wager is won for each player responsive to the final low Blackjack hand for the player outranking the final low dealer Blackjack hand and the other half of the at least one game wager is won for each player responsive to the final high Blackjack hand for the player outranking the final high dealer Blackjack hand.

In some embodiments, responsive to the lack of specific cards being identified in the initial dealer hand, the high dealer Blackjack hand is formed to have the lowest numerical value possible so long as the low dealer Blackjack hand can be formed to have a numerical value less than or equal to the high dealer Blackjack hand.

In some embodiments of the aforementioned method, the decks of physical playing cards include a joker card, wherein the joker card is equivalent to an Ace (that is, either numerically eleven or one) when in a high or low player Blackjack game hand, and is equivalent either to an eleven, one or five when drawing to the dealer hand, if numerically counting the joker as a five would result in a low or high dealer hand having a standing total, such as a twenty.

In some embodiments of the aforementioned method, four cards are distributed to each of the initial player hands.

In some embodiments of the aforementioned method, four cards are distributed to the initial dealer hand.

In some embodiments of the aforementioned method, the at least one game wager comprises two equal wagers.

In some embodiments of the aforementioned method, half of the at least one game wager is a push for each player responsive to any one of the final low or high Blackjack hands for the player being the same rank as the final low or high dealer Blackjack hands, respectively, but not a bust.

In some embodiments of the aforementioned method, half of the at least one game wager is lost for each player responsive to any one of the final low or high Blackjack hands for the player being outranked by the final low or high dealer Blackjack hands, respectively.

In some embodiments of the aforementioned method, a second wager is received and won responsive to the initial player hand satisfying second wager preset criteria, wherein the second wager preset criteria comprises the initial player hand being equal to or greater than a certain poker rank.

In some embodiments of the aforementioned method, a second wager is received and won responsive to the initial player hand satisfying second wager preset criteria, wherein the second wager preset criteria comprises the initial player hand being equal to or greater than a certain numerical value according to the standard rules of Blackjack.

Some embodiments of the invention are directed to a system for providing a Blackjack-based wagering game, which may be provided at a remote location, the system comprising a processor, communication device and display device, configured to: receive a game wager from a participating player; display an initial player hand for each participating player and an initial dealer hand, wherein each of the initial hands include at least three randomly generated playing cards and wherein the identity of one or more of the playing cards of the initial dealer hand is displayed; receive a player selection through the communication device to divide the playing cards in the respective initial player hand into a high Blackjack game hand and a low Blackjack game hand, wherein the high Blackjack game hand must be of a numerical value greater than or equal to the low Blackjack game hand according to the standard rules of Blackjack; continue the Blackjack game according to the standard rules of Blackjack to form final high and low Blackjack game hands; form a final high and a final low dealer Blackjack hands from the initial dealer hand according to preset house rules; and settle the game wager based on the outcome of the comparison of the hand values of the final player Blackjack hands and the final dealer Blackjack hands, wherein half of the at least one game wager is won for each player responsive to the final low Blackjack hand for the player outranking the final low dealer Blackjack hand and the other half of the at least one game wager is won for each player responsive to the final high Blackjack hand for the player outranking the final high dealer Blackjack hand.

In some embodiments of the aforementioned system, the communication device, processor and display device are mounted within a unitary housing.

In some embodiments of the aforementioned system, the processor is remotely located from the display device and communication device.

In some embodiments of the aforementioned system, four cards are randomly generated for each of the initial hands by a random number generator.

In some embodiments of the aforementioned system, four cards are randomly generated for each of the initial hands by distributing cards from one or more randomly ordered decks of standard playing cards.

In some embodiments of the aforementioned system, the communication device includes an input device for receiving an item having monetary value.

Some embodiments of the invention are also directed to a computer-aided method of conducting a Blackjack-based wagering game that includes the steps as described above, including receiving a game wager through a communication device; randomly generating virtual representations of playing cards to form initial player and dealer hands; receiving player input selections to form a high and a low Blackjack game hand for the player through the communication device; a processing device for executing a program to continue play a Blackjack game with the high and low Blackjack game hands, form high and low dealer Blackjack hands from the initial dealer hand according to a preset method and continue the Blackjack game until final dealer high and low hands are formed, and compare the high and low player hands with the high and low dealer hands to determine the outcome of the game wager, wherein half of the at least one game wager is won for each player responsive to the final low Blackjack hand for the player outranking the final low dealer Blackjack hand and the other half of the at least one game wager is won for each player responsive to the final high Blackjack hand for the player outranking the final high dealer Blackjack hand. In some embodiments, the computer-aided method may involve a device with an input device such as a bill acceptor configured to accept a bill, a ticket, and/or a cash card into the system to enable an amount of credits associated with a monetary value of the bills, ticket, and/or cash card to be credited to system for play of a game program as described herein stored in the memory device.

The communication device may be a data input and/or data output device or a remote computer terminal, such as a home computer or mobile device with access to local or global network. The system and communication device may be configured for providing the modified wagering game to players via an online system or the Internet. The processor may also be remotely located from the display device and communication device.

In some embodiments, the communication device, processor and display device are mounted within a unitary housing. The aforementioned system may be an electronic gaming machine or electronic platform including multiple data input devices providing player positions.

DETAILED DESCRIPTION OF SOME EMBODIMENTS OF THE INVENTION

It should be understood that the methods and steps recited herein may be partially or wholly carried out in a variety of ways, such as by a dealer physically using game elements in a casino, via an electronic gaming machine (EGM) in a gaming establishment, through a computer or portable device, such as a mobile phone, capable of communicating via the Internet, global telecommunication network or world wide web. It should further be understood that the methods and systems of the invention are described herein in connection with standard playing cards for illustrative purposes only, as the methods and systems of the invention may be used with non-standard playing cards or any other items with varying distinguishable symbols.

Figure 1:
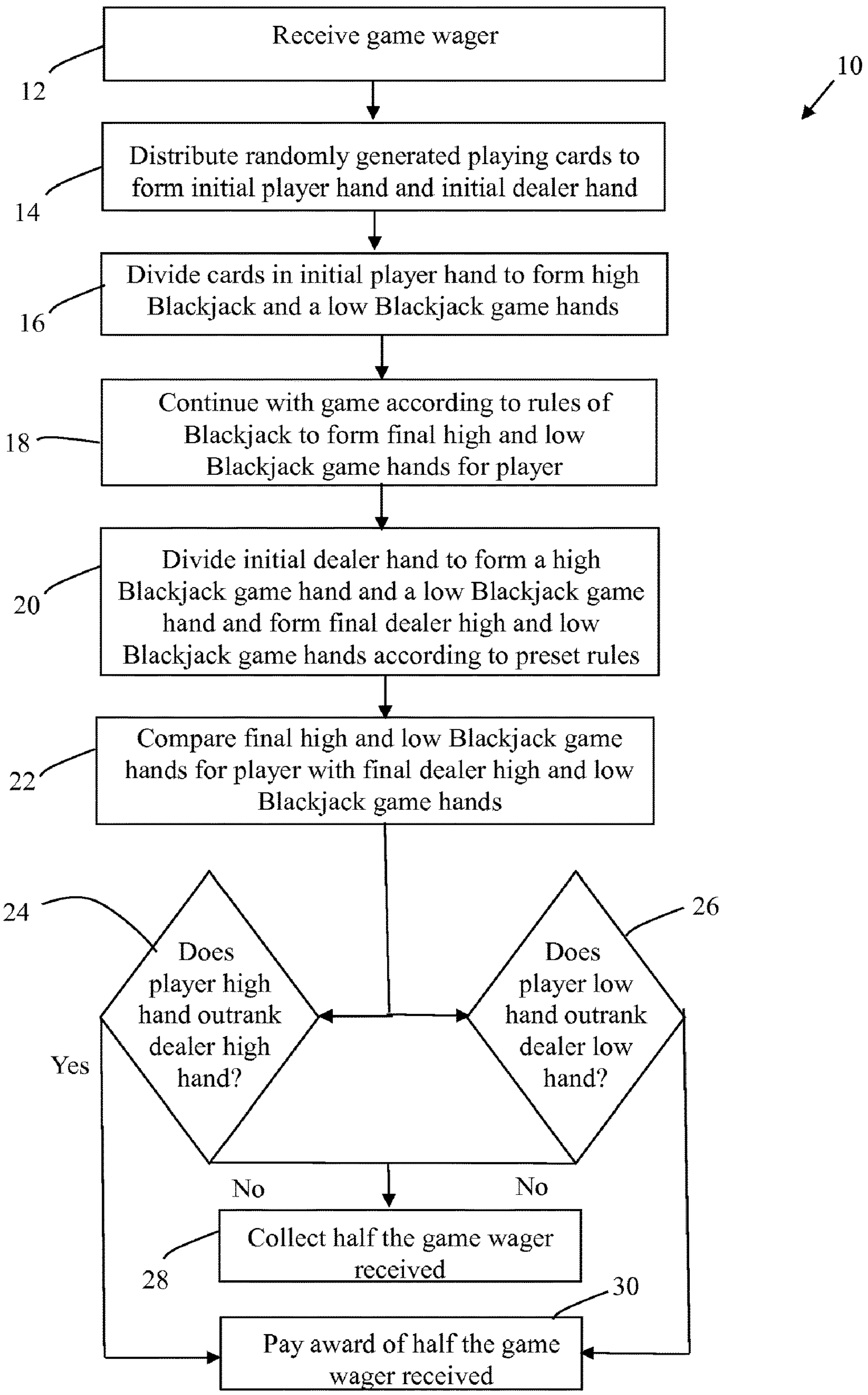
FIG. 1 is a process flow chart depicting an exemplary game play method configured and constructed according to some embodiments of the invention.

In some embodiments, the invention is directed to a method of playing an underlying wagering game, such as Blackjack, which includes steps generally referred to by the reference numeral 10 in FIG. 1.

In step 12, a game wager is received by a player interested in playing the underlying game which follows the conventional Blackjack hand scoring method for determining hand value and resolving the game outcome based on a comparison of two player hand values with two dealer hand values, with the winning hand being the one which has a value closest to or equal with twenty one but not over. However, it should be understood that the invention may be applied and adapted to other games, particularly games in which there at least two randomly generated hands of gaming elements, such as standard or non-standard playing cards, that compete with one another. For purposes of illustration, the underlying wagering game of this embodiment will employ one or more decks of standard playing cards, which may be randomly ordered and shuffled by hand or machine. It should be understood that receiving a wager typically also involves a player affirmatively engaging in an action that is interpreted to place a monetary amount at risk. By receiving the wager, a gaming operator or host is also placing some monetary amount at risk, which may be determined or expressed as being equal to, or a multiple of, the monetary amount which the player is placing at risk. The affirmative action of the player to place an amount at risk may include pressing a button or physically placing a gaming chip on a designated betting area on a table game felt layout. The game operator or host may receive the wager, thus indicating acceptance thereof, through a variety of actions, which may involve illumination of betting areas on a table or other displays, or by continuing to step 14 in which randomly ordered playing cards are distributed to form the initial player hands and the two initial dealer hands as discussed herein. It should be understood that a game wager may be a singular representation, such as a gaming chip, or more, such as two gaming chips, one for each player hand.

In step 14, playing cards from one or more randomly-ordered decks, or in other embodiments, randomly generated virtual representations of playing cards, are dealt to form an initial player hand and an initial dealer hands. An automated shuffling device may be operatively associated with a gaming table for facilitating provision of gaming method 10 which can be operated as part of step 14 in order to provide one or more randomly-ordered deck of cards. The decks of cards may include all the standard cards or may be modified, such as by having all four ten cards removed from each deck. Modifications to the contents of the one or more decks may be made for a variety of reasons, such as to adjust the house advantage either in favor of the house or player.

In this embodiment, the initial hands include four cards, but may include other amounts of cards, such as three or five cards. The distribution of playing cards may follow a particular preset sequence and order. For example, according to the rules of conventional Blackjack, dealing cards involves a pattern in which each player receives a first card, beginning with the player to the left-most of the dealer and then proceeding to the right until all players have a first card. In an alternative embodiment, players may be chosen randomly as the first player to receive the first card. In yet another alternative, dealing may start from a new player position after each round of the play, such as the adjacent player position as the starting player position from the dealing in the prior round. The cards are dealt to each player position around the table clockwise from the starting player position with the dealer receiving cards in order of the table. In this embodiment, the initial player hands may be dealt with the cards face up or face down, that is, either in a manner which immediately reveals the card rank, suit and value or not, while one of the cards in the initial dealer hand is dealt face-up or revealed with the remaining cards dealt face-down or hidden.

In some embodiments, the cards in the initial hand, either player and/or dealer, may be compared with a preset criteria to determine the outcome of a side wager. The preset criteria may relate to any one or more identifiable characteristics and/or sub-characteristics of the cards and hand, including their rank and/or suit, or value in the game, or lack thereof. The side wager may be received prior to the distribution of the cards in the same manner as the game wager is received in step 12. A paytable may be provided which lists the preset criteria for the initial hands to meet in order for a payout to be awarded to the player, such as the initial hands having achieved a poker rank or numerical value.

As shown in step 16, the cards in the initial player hand will be divided to form a high Blackjack game hand and a low Blackjack game hand. The high Blackjack game hand must have a numerical value which is greater than or equal to the numerical value of the low Blackjack hand, according to the conventional rules of Blackjack. In some embodiments, players form the high game hand and low game hand by moving cards into certain defined areas on a table layout.

These hands are in an initial condition in the game of Blackjack in that the option to hit has not been provided and no additional cards have been dealt to any of the hands. As shown by step 18, the underlying game continues according to the rules of Blackjack to form the final high and low game hands for each player.

As shown by step 20, any unrevealed cards in the initial dealer hand are revealed and the cards are divided to form high and low Blackjack game hands according to a preset house way. Once formed, each dealer hand is played similarly to the conventional rules for setting the dealer hand in Blackjack.

Provided that the final player hands have not busted, that is, ended up with a score over twenty-one, then the game wager received in step 12 will be settled based on a comparison of each of the final high and low Blackjack game hands for the player against the final dealer high and low hands, respectively, as shown in step 22, to determine if the player high hand and player low hand outranks the dealer high and low hands as shown by steps 24 and 26.

As shown by step 28, if the player high hand does not outrank the dealer high hand in step 24 then half the game wager received in step 12 is collected. Similarly, if the player low hand does not outrank the dealer low hand in step 26 then half the game wager received in step 12 is collected in step 28.

As shown by step 30, if the player high hand outranks the dealer high hand in step 24 then an award of half the game wager received in step 12 is paid to the player. Similarly, if the player low hand outranks the dealer low hand in step 26 then an award of half the game wager received in step 12 is paid to the player in step 30.

In some embodiments, hands which tie are a push, that is, a player high hand and dealer high hand or a player low hand and dealer low hand will result in a push on each respective half of the game wager received in step 12. In other embodiments, a push may be collected as a loss or awarded as a win.

An exemplary preset house way may set forth, based on the cards in the initial dealer hand, a hierarchy to follow such as: if a low dealer hand of nineteen or more can be made, then the dealer makes the best possible low hand; otherwise, if a high hand of twenty or more can be made, then the dealer makes the best possible high hand; otherwise, if a low hand of ten or eleven can be made, then the dealer sets the low hand to eleven if possible or ten if not; otherwise, if a high hand of ten or eleven can be made, then the dealer sets the high hand to eleven if possible or ten if not; otherwise, if a low hand of eighteen can be made, then the dealer sets the low hand to eighteen; otherwise, if a high hand of seventeen can be made, then the dealer makes the best possible high hand; otherwise, if the dealer has exactly two Aces (which may include one wild card) or two wild cards, then the dealer places one Ace or wild card in the high hand and the other Ace or wild card in the low hand; otherwise, the dealer makes the lowest scoring high hand possible. The dealer high hand formed from the initial hand prior to continuing the Blackjack game must have a numerical score that is greater than or equal to the dealer low hand score formed from the initial hand prior to continuing the Blackjack game. When evaluating the score of a hand with Aces, the soft score is always used. Once the high hand and low hands are formed, the dealer continues the Blackjack game and hits each hand to a total of hard seventeen or soft eighteen, that is, the dealer hits on soft seventeen, prior to comparing the dealer high and low hands with the player high and low hands, such as described in step 22.

The various illustrative embodiments of the invention may be implemented in conjunction with a physical table as a live table game utilizing physical playing cards and money or chips representative of the actual dollar value of a wager. The physical playing surface may include positions that facilitate play, such as designated hand placement areas for the player and dealer hands and designated wagering areas for receiving the game and/or second wager, which is initiated by the player placing their money or representative thereof in the designated areas. Alternatively, the methods according to the invention may be implemented in part or whole by computer hardware devices, and presented by means of computer program code which, by way of example, when executed by a processor, causes the display of the game and conditions of the hands on a display device. A random number generator may also be employed as part of the program code to simulate the dealing of playing cards from one or more randomly-ordered decks of playing cards.

Figure 2:
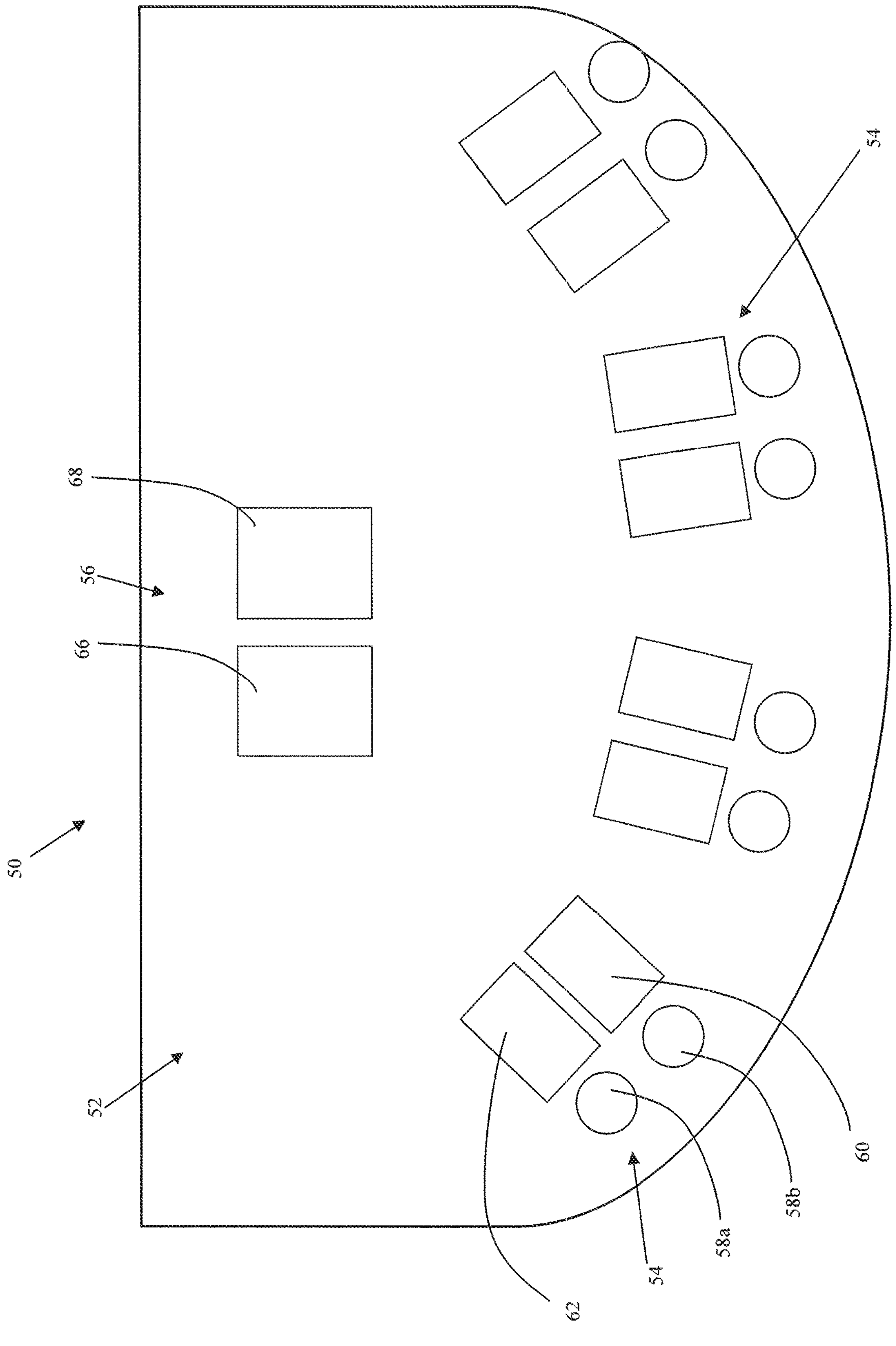
FIG. 2 is a representation of an exemplary layout for facilitating play of game methods according to some embodiments of the invention.

FIG. 2 illustrates an exemplary system 50 configured for operating in accordance with embodiments of the invention. System 50 includes a layout 52 for use in facilitating the presentment and display of a method of the invention such as method 10 or computerized version thereof. Layout 52 may be a physical felt implemented on a gaming table or a virtual representation of a felt table display presented on a display device, as it should be understood that the methods of the invention would function as described herein if any one or more of the layout, cards, dealers or wagering chips or apparatus were physically provided or virtually represented and facilitated through a computer with appropriate hardware devices and programs. System 50 further includes multiple player positions or interfaces 54 accessible on layout 52 and a dealer position or interface 56. It should be understood that the amount of interfaces 54 may vary and the amount shown in FIG. 2 is for illustrative purposes only. In this embodiment, each player position 54 includes a game wagering positions 58*a,b* for placing the game wager for receiving by the operator. In this embodiment, the game wager is received in two separate equal parts, such that two of the same amount of chips are placed in each wagering position 58*a* and 58*b*. However, it should be understood that the game wagers in positions 58*a,b* may be unequal, with payouts being adjusted accordingly. Position 54 includes a high Blackjack game hand forming position 60, and a low Blackjack game hand forming position 62. Dealer position 56 includes a first dealer hand position 66 and a second dealer hand position 68 for forming the respective high and low dealer hands. It should be understood that player interface 56 may further include a device for electronically receiving wagering credit, placing wagers and distributing payouts as described in this embodiment and in accordance with the invention. In some embodiments, each player position 54 on layout 52 further includes a side wagering position for receiving a wager relating to the contents of the initial hands.

Figure 3:
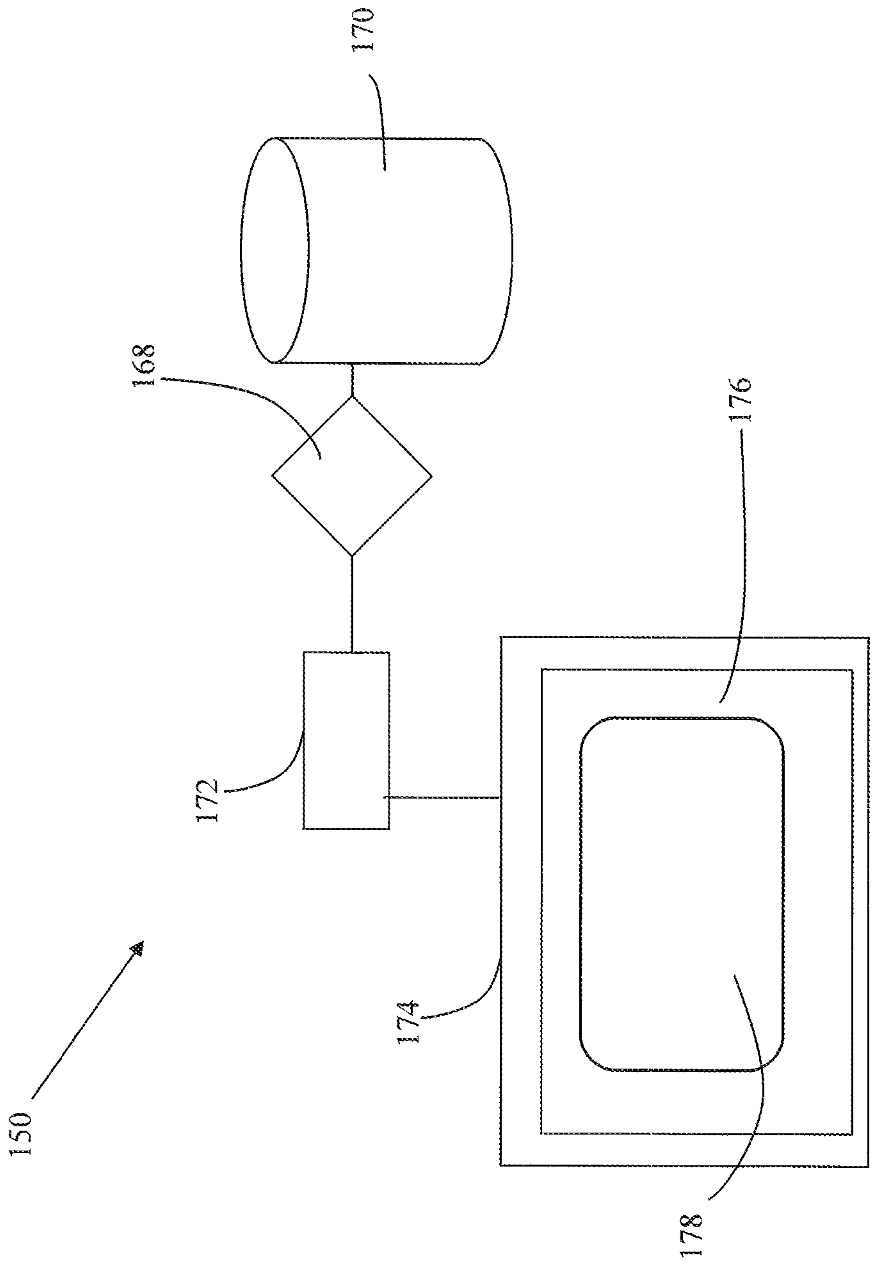
FIG. 3 is a schematic diagram depicting the components of an exemplary system configured and constructed according to some embodiments of the invention.

FIG. 3 illustrates an exemplary system 150 constructed in accordance with some embodiments of the invention. System 150 includes processing device 168 in communication with a database or memory device 170, communication or data input/output device 172 and a display device 174. In some embodiments, display device 174 is a touch-enabled device and includes a data input device component. Memory device 170 may include data relating to the underlying game and embodiments of the invention as described herein, such as the preset criteria. A player position 176 is displayed on display device 174 along with virtual representation of a layout and wagering area 178 for transmitting wagers in accordance with any of the embodiments herein, such as method 10. Game play is displayed on display device 174 and processing device 168 facilitates distribution of randomly generated hands of virtual cards to form the initial player hand for each player and the dealer, and the formation of the high and low hands. Player input selections may be received through display device 174. Processing device 168 accesses a program in memory device 170 for forming the dealer hand, before comparing the high and low player and dealer hands to determine the outcome of the game wagers.

Data input device 172 may include or be in communication with a bill acceptor configured to accept a bill, a ticket, and/or a cash card into the system 150 to enable an amount of credits associated with a monetary value of the bills, ticket, and/or cash card to be credited to system 150 for play of the game program in memory device 170.

Those skilled in the art will readily appreciate that the methods described herein may be incorporated in systems such as those discussed above that may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as a mobile device. The system of the invention may be provided on electronic platforms with multiple player positions. In addition, the system of the invention may be provided at least in part on a personal computing device, such as home computer, laptop or mobile computing device through an online communication connection or connection with the Internet. The game may be provided on a computing device, such as a home computer, kiosk or terminal which permits wagering on a live studio version of the method of the invention. Those skilled in the art will further appreciate that the precise types of software and hardware used are not vital to the full implementation of the methods of the invention so long as players and operators thereof are provided with useful access thereto or the opportunity to play the game as described herein.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth in the claims and equivalents thereto.

What is claimed is:

1. A method of conducting a Blackjack-based wagering game over a communication network, comprising a remote user device, the remote user device including a first processor, a first memory, a display device, a communication device, the communication device being in communication with a game server, the game server having a second memory and a second processor, the game server being configured to execute a program stored at least partially in the second memory and actuate the steps of:

a) responsive to the game server detecting a communication of a game wager from the communication device, the game server generating one or more randomly ordered decks of virtual depictions of playing cards for use in an instance of the wagering game, wherein the one or more randomly ordered decks of playing cards include at least one joker card;

b) the game server displaying on the display device an initial player hand and an initial dealer hand, each of the initial player hand and the initial dealer hand including at least three playing cards, wherein the identity of one or more of the playing cards of the group in the initial dealer hand is displayed on the display device;

c) the game server receiving a communication of a player selection through the communication device to divide the playing cards in the initial player hand into a first Blackjack game hand and a second Blackjack game hand, wherein the first Blackjack game hand is of a numerical hand value either less than, greater than or equal to the second Blackjack game hand according to the standard rules of Blackjack;

d) the game server continuing the Blackjack game according to the standard rules of Blackjack to form a final first player Blackjack game hand and a final second player Blackjack game hand, the final first player Blackjack game hand and the final second player Blackjack game hand being formed independently of one another and including an additional one or more randomly generated playing cards responsive to one or more additional player selections communicated through the communication device, wherein the final first player Blackjack game hand is formed from the first Blackjack game hand and the final second player Blackjack game hand is formed from the second Blackjack game hand;

e) the game server forming a final first dealer Blackjack game hand and a final second dealer Blackjack game hand from the initial dealer hand according to preset rules stored in the second memory, wherein the final first dealer Blackjack game hand includes a first portion of the playing cards from the initial dealer hand and the final second dealer Blackjack game hand includes a second portion of the playing cards in the initial dealer hand, and wherein the final first dealer Blackjack game hand and the second dealer Blackjack game hand are formed independently of one another;

f) the processor determining the Blackjack hand values of each of the final first player Blackjack game hand, the final second player Blackjack game hand, the final first dealer Blackjack game hand and the final second dealer Blackjack game hand, wherein the joker card is assigned a value by the game server equivalent to one of (i) an Ace playing card responsive to the joker card being included in one of the final first player Blackjack game hand and the final second player Blackjack game hand, and (ii) an Ace playing card or a five playing card responsive to the joker card being included in one of the final first dealer Blackjack game hand and the final second dealer Blackjack game hand;

g) the processor comparing the Blackjack hand values of the final first player Blackjack game hand with the final first dealer Blackjack game hand and the final second player Blackjack game hand with the final second dealer Blackjack game hand; and h) the game server settling the game wager based on the outcome of the comparison of the Blackjack hand values of the final player Blackjack game hands and the final dealer Blackjack game hands, wherein half of the at least one game wager is won responsive to any of the final Blackjack game hands having a Blackjack hand value determined by the processor as outranking at least one of the final dealer Blackjack game hands and the other half of the at least one game wager is won responsive to the remaining other final player Blackjack game hand having a Blackjack hand value determined by the processor as outranking the remaining other final dealer Blackjack game hand.

2. A method according to claim 1, wherein responsive to the lack of specific cards being identified in the initial dealer hand, the first dealer Blackjack hand is formed to have the lowest numerical value possible provided that a preset condition is satisfied, wherein the preset condition is the second dealer Blackjack hand can be formed to have a numerical value less than or equal to the first dealer Blackjack hand.

3. A method according to claim 1, wherein four cards are distributed to each of the initial player hands.

4. A method according to claim 1, wherein four cards are distributed to the initial dealer hand.

5. A method according to claim 1, wherein the game wager comprises two equal wagers.

6. A method according to claim 1, wherein half of the game wager is a push for each player responsive to any one of the final first or second Blackjack hands for the player being the same rank as the final first or second dealer Blackjack hands, respectively, but not a bust.

7. A method according to claim 1, wherein half of the game wager is lost for each player responsive to any one of the final first or second Blackjack hands for the player being outranked by the final first or second dealer Blackjack hands, respectively.

8. A method according to claim 1, wherein a second wager is received and won responsive to the initial player hand satisfying second wager preset criteria, wherein the second wager preset criteria comprises the initial player hand being equal to or greater than a certain poker rank.

9. A method according to claim 1, wherein a second wager is received and won responsive to the initial player hand satisfying second wager preset criteria, wherein the second wager preset criteria comprises the initial player hand being equal to or greater than a certain numerical value according to the standard rules of Blackjack.

10. A system for providing a Blackjack-based wagering game, the system comprising a game server including a processor and a memory, the memory storing a game program and depictions of at least one deck of virtual playing cards, the at least one deck of virtual playing cards including at least one depiction of a virtual joker card; a remote user device including a communication device and a display device, the remote user device being enabled to communicate with the game server; wherein the system is configured to: a) responsive to the game server receiving a communication through the communication device to place a game wager, the game server actuating the execution of the game program, whereby display an initial player hand and an initial dealer hand are randomly generated by the game server from the depictions of virtual playing cards stored in the memory, wherein each of the initial player hand and the initial dealer hand include a group of playing cards and wherein the identity of one of the playing cards of the group of playing cards in the initial dealer hand is displayed on the display device;

b) responsive to receiving a communication of a player selection through the communication device to divide the playing cards in the initial player hand into a first Blackjack game hand and a second Blackjack game hand, the game server displaying on the display device the first Blackjack game hand and the second Blackjack game hand, wherein the first Blackjack game hand is of a numerical hand value either less than, greater than or equal to the second Blackjack game hand according to the standard rules of Blackjack;

c) the game server continuing the Blackjack game according to the standard rules of Blackjack to form final first and second player Blackjack game hands, wherein each of the final first and second player Blackjack game hands are formed independently of one another and include an additional one or more randomly generated playing cards responsive to one or more additional player selections being communicated through the communication device, wherein the joker card included in one of the final first and the final second player Blackjack game hands is equivalent to an Ace playing card;

d) the game server displaying on the display device a final first and a final second dealer Blackjack game hands from the initial dealer hand according to preset house rules, wherein each of the final first and final second dealer Blackjack game hands are formed independently of one another and may further include an additional one or more randomly generated playing cards, wherein the joker card included in one of the final first and the final second dealer Blackjack game hands is equivalent to one of (i) an Ace playing card or (ii) a five playing card, the value of the joker card being determined by the Blackjack hand value;

e) the game server comparing the Blackjack hand values of the final first player Blackjack game hand with the final first dealer Blackjack game hand and the final second player Blackjack game hand with the final second dealer Blackjack game hand;

f) the game server determining the outcome of the game wager based on the outcome of the comparison of the Blackjack hand values of the final player Blackjack game hands and the final dealer Blackjack game hands, wherein half of the game wager is won responsive to the final first Blackjack game hand outranking the final first dealer Blackjack game hand and the other half of the game wager is won responsive to the final second Blackjack game hand outranking the final second dealer Blackjack game hand; and g) the game server displaying a payout amount on the display device responsive to the game wager being won.

11. A system as recited in claim 10, wherein four cards are randomly generated for each of the initial hands by a random number generator.

12. A system as recited in claim 10, wherein four cards are randomly generated for each of the initial hands by distributing cards from one or more randomly ordered decks of standard playing cards.

13. A system as recited in claim 10, wherein the communication device includes an input device for receiving an item having monetary value.

14. A system as recited in claim 10, wherein responsive to the lack of specific cards being identified in the initial dealer hand, the first dealer Blackjack hand is formed to have the lowest numerical value possible so long as the first dealer Blackjack hand can be formed to have a numerical value less than or equal to the second dealer Blackjack hand.

* * * * *